(12) United States Patent
Potthoff et al.

(10) Patent No.: US 12,221,398 B2
(45) Date of Patent: Feb. 11, 2025

(54) SPRAY NOZZLE FOR PRODUCING A UREA-SULFUR FERTILIZER

(71) Applicants: thyssenkrupp Fertilizer Technology GmbH, Dortmund (DE); thyssenkrupp AG, Essen (DE)

(72) Inventors: Matthias Potthoff, Dortmund (DE); Harald Franzrahe, Dortmund (DE); Thomas Johner, Wuppertal (DE); Luc Albert Vanmarcke, Eeklo (BE)

(73) Assignees: thyssenkrupp Fertilizer Technology GmbH, Dortmund (DE); thyssenkrupp AG, Essen (DE)

( * ) Notice: Subject to any disclaimer, the term of this patent is extended or adjusted under 35 U.S.C. 154(b) by 996 days.

(21) Appl. No.: 16/973,517

(22) PCT Filed: Jun. 7, 2019

(86) PCT No.: PCT/EP2019/064991
§ 371 (c)(1),
(2) Date: Dec. 9, 2020

(87) PCT Pub. No.: WO2019/238570
PCT Pub. Date: Dec. 19, 2019

(65) Prior Publication Data
US 2021/0238107 A1   Aug. 5, 2021

(30) Foreign Application Priority Data
Jun. 12, 2018   (EP) .................................... 18177289

(51) Int. Cl.
*C05C 9/00*   (2006.01)
*B01J 2/16*   (2006.01)
(Continued)

(52) U.S. Cl.
CPC ................ *C05C 9/005* (2013.01); *B01J 2/16* (2013.01); *B05B 7/0068* (2013.01); *B05B 7/10* (2013.01)

(58) Field of Classification Search
CPC .......... C05C 9/005; B01J 2/16; B05B 7/0068; B05B 7/10
See application file for complete search history.

(56) References Cited

U.S. PATENT DOCUMENTS 461,843 A    10/1891   Nordyke
470,138 A    3/1892    Botsford
(Continued)

FOREIGN PATENT DOCUMENTS

CA    2245992    *  3/1999  ................ B01J 2/04
DE    3116778 A      2/1982
(Continued)

OTHER PUBLICATIONS

DIN ISO 9277, Determination of the specific surface area of solids by gas adsorption—BET method (ISO 9277:2010), pp. 1-28, (Jan. 2014).
(Continued)

*Primary Examiner* — Wayne A Langel
(74) *Attorney, Agent, or Firm* — hyssenkrupp North America, LLC

(57) ABSTRACT

A spray nozzle for production of urea fertilizer granules and/or urea-sulfur fertilizer granules has a conveying channel and an atomizing gas channel. The conveying channel has at least one separating pin and the atomizing channel has at least one swirl element. The swirl element has inserts, cutouts and moving and fixed elements. The disclosure also sets out a fluidized bed granulator with a spray nozzle for production of a urea-sulfur fertilizer, a process for producing
(Continued)

a urea-sulfur fertilizer, and the use of the spray nozzle for production of fertilizer granules.

18 Claims, 3 Drawing Sheets

(51) Int. Cl.
*B05B 7/00* (2006.01)
*B05B 7/10* (2006.01)

(56) References Cited

U.S. PATENT DOCUMENTS

| | | | |
|---|---|---|---|
| 1,513,624 A * | 10/1924 | Parker | B05B 7/04 239/404 |
| 3,100,698 A | 8/1963 | Horsley | |
| 3,191,870 A * | 6/1965 | Willett | B05B 7/10 239/434.5 |
| 3,360,335 A | 12/1967 | Jenks | |
| 3,795,504 A * | 3/1974 | Wengeler | B01J 2/16 71/64.02 |
| 4,219,589 A | 8/1980 | Goethals | |
| 4,330,319 A | 5/1982 | Bexton | |
| 4,343,622 A | 8/1982 | Bruynseels | |
| 4,473,185 A * | 9/1984 | Peterson | F23C 7/02 431/9 |
| 4,701,353 A | 10/1987 | Mutsers | |
| 5,934,555 A * | 8/1999 | Dobbeling | B05B 1/3478 239/404 |
| 7,998,235 B2 | 8/2011 | Kohnke | |
| 9,421,508 B2 | 8/2016 | Bedetti | |
| 2007/0200007 A1 | 8/2007 | Stevens et al. | |
| 2008/0305420 A1* | 12/2008 | Kinoshita | B05B 7/0433 430/118.5 |
| 2015/0149181 A1 | 5/2015 | Delahaye | |
| 2018/0117554 A1 | 5/2018 | Voorhans | |
| 2018/0244588 A1* | 8/2018 | Garcia Martinez | C05G 5/23 |
| 2018/0370865 A1* | 12/2018 | Potthoff | C05C 9/005 |

FOREIGN PATENT DOCUMENTS

| | | | | |
|---|---|---|---|---|
| EP | 0 900 589 A1 | 3/1999 | | |
| EP | 1701798 A | 9/2006 | | |
| GB | 2038468 A * | 7/1980 | | F28C 3/06 |
| JP | 2003103203 A | 4/2003 | | |
| RU | 2497597 A | 11/2012 | | |
| WO | 03106376 A | 12/2003 | | |
| WO | 2005061118 A | 7/2005 | | |
| WO | 2010060535 A | 6/2010 | | |
| WO | 2014005695 A | 1/2014 | | |
| WO | 2015104286 A | 7/2015 | | |
| WO | 2015104296 A | 7/2015 | | |
| WO | 2016016150 A | 2/2016 | | |
| WO | WO 2016016150 A1 * | 2/2016 | | C05C 9/00 |
| WO | 2017005695 A | 1/2017 | | |
| WO | WO 2017/005695 A1 * | 1/2017 | | C05C 9/00 |
| WO | WO 2017/103243 A1 * | 6/2017 | | C05C 9/00 |

OTHER PUBLICATIONS

English Translation of International Search Report issued in PCT/EP2019/064991, dated Jul. 16, 2019.

"Effect of Nitrogen and Sulphur Fertilizer on Aman Rice", Akter et al., Int. J. BioRes 18(6), pp. 12-19, (2013).

Effect of particle size of the oxidation of elemental sulfur; C.C: Boswell et al; New Zealand J. of Agricultural Res; (1988), pp. 31, 179-186.

Janzen H.H. et al; (1987); "Oxidation of elemental sulfur under field conditions in central Sakachwan"; Can. J. Soil Sci., 67;609-618.

DIN-ISO 9277.

* cited by examiner

SPRAY NOZZLE FOR PRODUCING A UREA-SULFUR FERTILIZER

CROSS REFERENCE TO RELATED APPLICATIONS

This application is a U.S. National Stage Entry of International Patent Application Serial Number PCT/EP2019/064991, filed Jun. 7, 2019, which claims priority to European Patent Application No. EP 18177289.8, filed Jun. 12, 2018, the entire contents of both of which are incorporated herein by reference.

FIELD

The present disclosure generally relates to a spray nozzle for production of a urea-sulfur fertilizer.

BACKGROUND

In view of global population growth, the development of flexible and efficient fertilizer mixtures is of major and growing significance. What is important here is not just the fertilizer itself, i.e. the chemical composition, but also the processing forms in transportable containers. What is certainly of greatest significance here is granulation to give uniform particles of identical size and characteristics. Important parameters here are low dust formation, strength, low tendency to aggregation, homogeneous size, storability and stability. An established granulation technique is fluidized bed granulation, which has improved particle properties compared, for example, to prilling techniques. One example for production of urea-containing fertilizer granules by means of fluidized bed granulation can be found in WO 2010/060535 A1, for example in paragraphs [0025]-[0035].

The use of urea-sulfur fertilizers in agriculture has already been known for a prolonged period of time. In such fertilizer mixtures, the plant can be provided simultaneously with both elements sulfur and nitrogen, such that it is possible to save steps and costs for deployment of a further fertilizer. Sulfur may either be in elemental or water-soluble form, for example in sulfate form. The water-soluble sulfur form may be absorbed directly by the plant, whereas elemental sulfur first has to be converted to the water-soluble form by microorganisms in the soil. This conversion process thus includes a kind of "depot action", such that the sulfur is released gradually to the plant over a prolonged period of time. In this way, targeted and controlled release of sulfur is possible, for example by means of mixtures of sulfate and elemental sulfur. In combination with urea, this enables, for example, supply of the sown plants at the early stage with nitrogen via the urea and with sulfur in the subsequent growth phases.

For that reason, the importance of urea-sulfur fertilizers having homogeneous distribution of urea and sulfur is ever-increasing. Examples can be found, for example, in U.S. Pat. No. 4,330,319 A.

In order to assure good biodegradability of the elemental sulfur in the soil, particles of minimum size are needed. These small particles, by contrast with larger particles, have a greater surface area relative to their volume. This greater surface area, especially the greater specific surface area (determinable, for example, by the BET method, for example to DIN-ISO 9277) improves the accessibility of the elemental sulfur to microorganisms present in the soil.

Since melts of elemental sulfur and urea are only of limited miscibility, particularly on account of the different densities and viscosities, urea-sulfur fertilizers are frequently traded in the form of sulfur-coated urea particles. Another possible example is that of polymeric sulfur-coated urea particles. However, the coating of the urea particles with sulfur is quite a complex process; moreover, the release rates, both with regard to the sulfur and to the urea, in the soil are predictable and reproducible only with difficulty. Moreover, coated urea particles frequently have a distinctly greater particle size, which, as described above, has an adverse effect on the uniform breakdown of the elemental sulfur. Studies ("Effect of particle size on the oxidation of elemental sulfur"; C. C. Boswell et al.; New Zealand J. of Agricultural Res; 1988, 31, 179-186) showed that particle sizes of 10 μm to 150 μm, especially 10 μm to 38 μm, are preferred.

Owing to the poor miscibility of urea and elemental sulfur mentioned, mixing apparatuses such as mixers are frequently used. However, these require additional apparatus components, for example static mixers. These additional process steps, moreover, inevitably increase the costs of the process. A further starting point is that of mixing additives. These improve the miscibility of the components, for example by reducing the surface tension of urea and sulfur in the melt.

At the same time, however, further additives alter the properties of the finished granules and increase the costs of the finished product.

U.S. Pat. No. 3,100,698 A discloses a urea-sulfur fertilizer and the production thereof from a urea and sulfur melt, mixing of the melts and obtaining the solid particles, for example via a prilling method.

WO 03/106376 A1 discloses a process for producing a urea-sulfur fertilizer in which an additive which is amphoteric with respect to the mixture urea and sulfur is added. Examples of suitable surfactants are $C_{6-30}$ fatty acids, preferably myristic acid.

WO 2014/005695 A1 discloses a process for producing an emulsion from elemental sulfur particles. By adding a multifunctional surfactant, it is possible to obtain urea-sulfur fertilizers.

WO 2015/104296 A1 discloses a fertilizer composition comprising urea, sulfur and a lignin compound.

Further examples of a homogeneously distributed urea-sulfur fertilizer and processes for production thereof can be found in WO 2015/104286 A1 and WO2016/016150 A1.

WO 2005/061118 A1 discloses a spray nozzle for fluidized bed granulation. This nozzle contains a mixture of the atomizing medium with the melt in the nozzle.

WO 2017/005695 A1 discloses a process for producing a particulate fertilizer based on elemental sulfur and urea. The process disclosed does not require the use of additional additives for production of the sulfur/urea mixture.

US 2008/0305420 A1 discloses a process and a nozzle for coating of particles.

US 2018/0117554 A1 discloses a process and fluidized bed granulator for production of urea or ammonium nitrate particles.

Thus, a need exists for a spray nozzle for production of improved, homogeneously distributed urea/sulfur granules that permits a process regime without additional mixing steps or additives, or reduces the use of further mixing steps or additives.

DETAILED DESCRIPTION

Figure 1:
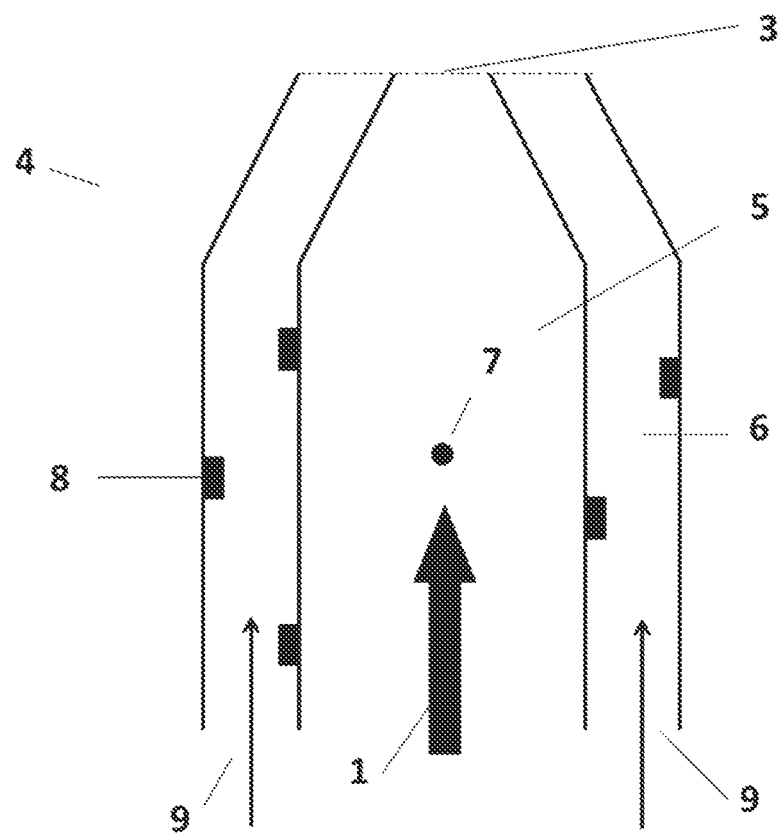
FIG. 1 is a schematic cross section through the spray nozzle.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a spray nozzle for production of a urea-sulfur fertilizer, to a fluidized bed granulator having a spray nozzle for production of a urea-sulfur fertilizer, to a process for producing a urea-sulfur fertilizer and to the use of the spray nozzle for production of fertilizer granules.

The invention further comprises a fluidized bed granulator having a spray nozzle for production of urea fertilizer granules and/or urea-sulfur fertilizer granules, a process for producing a urea-sulfur fertilizer, and the use of the spray nozzle for production of fertilizer granules. Further advantageous configurations can be found in the respective dependent claims.

The spray nozzle of the invention for production of urea fertilizer granules and/or urea-sulfur fertilizer comprises at least one conveying channel and an atomizing gas channel. The spray nozzle comprises or is preferably constructed from metals and/or metal alloys, more preferably corrosion-resistant metals and/metal alloys, especially preferably stainless steels. Suitable metals/metal alloys include, for example, iron, chromium, vanadium, nickel, titanium, aluminum, cobalt, tungsten. The spray nozzle of the invention may also comprise thermally stable (>100° C.) polymers or ceramics. The spray nozzle may optionally, especially in the region of the conveying channel, include corrosion-inhibiting coatings, for example polytetrafluoroethylene. The spray nozzle is characterized in that the conveying channel has at least one separating pin and the atomizing channel has at least one swirl element.

The separating pin may be of variable construction and may be executed, for example, as a single land or individually or multiply crossing lands. The separating pin in the context of the invention comprises cylindrical, rod-shaped, angular and/or cone-shaped inserts and/or rods. A corresponding definition can also be found for the German term "Stift" [pin] at "https://www.duden.de/rechtschreibung/Stift_Schreibgeraet_Nagel_Knirps #bedeutunge n".

The separating pin in the context of the invention may also be executed as a wire. The separating pin is inserted within the conveying channel. The separating pin enables, in flow direction of the melt, separation and subsequent mixing of the melt at or beyond the separating pin in flow direction. The expression "melt" in the context of the invention encompasses salt melts, salt and/or solid solutions, dispersions and/or mixtures thereof. The expression "melt" in the context of the invention preferably encompasses urea solutions, solutions/emulsion/dispersions containing sulfur salts and/or dispersions or solutions containing elemental sulfur, preferably individually or collectively containing more than 50% by weight of urea, sulfur and/or sulfur salts. In flow direction of the melt beyond the separating pin, the melt is recombined. This separation and combination of the melt enables better homogenization and mixing of the melt. The separating pin is preferably mounted in a fixed manner in the conveying channel; alternatively, a moving arrangement is also possible, for example analogously to a screw mounted in the conveying channel. The separating pin preferably comprises metals, metal alloys, glass blocks, ceramics, or polymers that are thermally stable (greater than 100° C. up to about 200° C.).

The atomizing channel has at least one swirl element and provides the gas flow, preferably air flow, needed for production of the atomized melt droplets or solution droplets. The expression "atomize" in the context of the invention relates to fine droplets of melt or solution dispersed in the gas stream. The expression "atomized" in the context of the invention does not relate to the separation of molecular bonds or the presence of individual atoms. The swirl elements permit division (splitting) of an atomizing gas, for example air, into various secondary streams and turbulences. The swirl elements may be designed in the form of cutouts, projections, elements mounted in the atomizing channel, swirl elements and inserts, cutouts, moving and fixed elements, and in the context of the invention include elements mounted or arranged in the atomizing channel that generate deflection or division of the atomizing gas and increase the turbulent fraction of the atomizing gas in the atomizing channel. These may be elements mounted in the atomizing channel or else cavities and/or flow barriers. The swirl elements thus surprisingly enable sufficient formation of microdroplets of the melt. Surprisingly, the spray nozzle of the invention already achieved a sulfur particle size below 30 μm without any need for further emulsifying additions to urea/sulfur melt. The swirl elements may preferably be part of the atomizing channel or inserted elements comprising metals, metal alloys, glass blocks, ceramics, or polymers. Both methods, separating pin and swirl elements, surprisingly preferably permit a sulfur particle size below 30 μm in the finished urea-sulfur fertilizer grains, and homogeneous distribution of the sulfur particles in the urea, for example the urea matrix. The spray nozzle of the invention additionally preferably makes it possible to dispense with further stirrer apparatuses, for example mixers.

In a preferred execution, the conveying channel has two crossing separating pins. The crossing separating pins enable very homogeneous mixing of the melt.

The swirl elements preferably have inserts, cutouts, and moving and fixed elements.

The conveying channel and the atomizing gas channel are preferably planar to one another and form a common exit opening. The mixing of the atomizing gas and the droplets of the melt thus takes place outside the nozzle and hence not in a mixing chamber within the nozzle. This enables very uniform and homogeneous mixing between melt and atomizing gas.

The invention further encompasses a fluidized bed granulator comprising at least one spray nozzle of the invention disposed at and/or above a perforated plate. The spray nozzle of the invention for production of a urea-sulfur fertilizer comprises at least one conveying channel and an atomizing gas channel. The spray nozzle is characterized in that the conveying channel has at least one separating pin and the atomizing channel has at least one swirl element. The spray nozzle and the preferred configurations of the spray nozzle correspond to those described above. An illustrative construction of a fluidized bed granulator, for example for production of urea-containing particles, can be found in WO 2010/060535 A1, for example in paragraphs [0025]-[0035], FIG. 1 or in U.S. Pat. No. 4,701,353 A, DE 31 16 778 A1 and U.S. Pat. No. 4,219,589 A. The fluidized bed granulator preferably has at least one granulator space, a perforated plate disposed within the granulator space and spray nozzles of the invention disposed in/on the perforated plate. The spray nozzles of the invention have preferably been connected to feeds for melt of urea and sulfur and a feed for the atomizing gas. The expression "atomizing gas" in the context of the invention relates to a gas for fluidization, emulsification and dispersion of the melt or solution, preferably of urea and sulfur. The fluidized bed present in the granulator is connected to a fluidizing gas stream, preferably air. The seed grains present in the fluidized bed grow through contact with the melt droplets generated in the atomizing medium. The finished particles are subsequently cooled in the granulator or in the separate cooler and sent to the continuation of the process, for example sieving, aftertreatment and packing.

The invention further encompasses a process for producing a urea-sulfur fertilizer. The process of the invention comprises at least the following steps: providing a melt comprising urea and elemental sulfur, spraying the melt and atomizing gas into a fluidized bed granulator having a spray nozzle, and obtaining granules in the fluidized bed granulator. If oxygen-sensitive granules are to be produced, rather than air or in addition, gases/gas mixtures of noble gases, especially argon, nitrogen or carbon dioxide, may also be used as atomizing gas. The spray nozzle used in the process is characterized in that the spray nozzle has at least one conveying channel and one atomizing gas channel. In addition, the conveying channel has at least one separating pin and the atomizing channel at least one fluidizing element. The spray nozzle and the preferred configurations of the spray nozzle correspond to those described above.

In a preferred embodiment of the process, the spray nozzle is heated within the temperature range from 1° C. to 10° C., preferably 2° C. to 5° C., above the crystallization temperature of the melt. The above temperature range enables deployment of the melt with appropriate viscosity and flow rate.

The melt is preferably introduced via the conveying channel at a pressure of 0.5 bar to 7 bar. All the pressure figures used are based on gauge pressure in bar above atmospheric pressure.

The melt is preferably introduced via the conveying channel at a flow rate of 50 kg/h to 600 kg/h.

In a further preferred embodiment, the atomizing gas is introduced via the atomizing channel at a flow rate of 100 kg/h to 400 kg/h.

The atomizing gas is preferably introduced via the atomizing channel at a pressure of 0.1 bar to 2 bar.

The melt is preferably obtained by continuously mixing a urea-containing melt and an elemental sulfur-containing melt. Mixing additives which, for example, lower interfacial tension and differences in viscosity and/or density between the sulfur melt and the urea melt are dispensable in the process of the invention.

In a preferred embodiment, the granules contain 2% by weight to 30% by weight of sulfur, preferably 5% by weight to 20% by weight of sulfur. However, the ultimate sulfur content is also variable over the range described above within the scope of the provisions relating to the final fertilizer granules.

In an alternative preferred embodiment, the melt contains an additive which is amphiphilic relative to urea and elemental sulfur. The expression "amphiphilic" describes an additive that has chemical/physical structural features that enable good solubility both in the urea melt and in the sulfur melt. Incidentally, the term "amphiphilic" is used analogously to its use in the case of detergents and surfactants for oil/water mixtures. As well as solubility, the additive enables, for example, the lowering of interfacial tension and of the differences in viscosity and/or density between the urea melt and the sulfur melt.

The amphiphilic additive preferably comprises anionic, cationic or nonionic surfactants, preferably salts and esters of fatty acids, SDS (sodium dodecylsulfate), AOT (dioctyl sodium sulfosuccinate), lignin and/or lignosulfonates and/or mixtures or derivatives thereof.

The melt preferably contains a granulating aid, more preferably formaldehyde or a formaldehyde-free granulating additive. The granulating aid reduces dust formation, increases strength and reduces the tendency of the granules to cake.

The formaldehyde-free granulating additive preferably contains a combination of at least one polymer or oligomer containing amino groups and at least one functionalized polyvinyl compound, more preferably a combination of polyethyleneimine and polyvinyl alcohol. Polymers and oligomers containing amino groups that are used in accordance with the invention especially include polymers and oligomers having a molecular weight (MW) of 250 to 2 000 000 daltons. For example, useful polymers and oligomers containing amino groups include polyamines, polymeric polyamines, nitrogen-substituted vinyl polymers, polyoxazolines, polypropyleneimine and dendrimers thereof, polyethyleneimine and dendrimers thereof, polyamidoamine and dendrimers thereof, and copolymers and derivatives and combinations of two or more of the substances mentioned.

Preferred polymers and oligomers containing amino groups include polyamines and polymeric polyamines, polyalkyleneimines, for example polyethyleneimines and polypropyleneimines, polyvinylamines, polyalkoxylated polyamines, ethoxylated polyamines, propoxylated polyamines, alkylated and benzylated polyamines, and combinations of two or more of the aforementioned components.

Polymers and oligomers containing amino groups used with very particular preference include polyethyleneimine, polyethyleneimine dendrimers, and copolymers thereof, derivatives and mixtures of at least two of these components.

Suitable polyethyleneimines may comprise linear or branched polyethyleneimine polymers or oligomers having, for example, 10 or more monomer units and their derivatives, analogs, copolymers and mixtures of at least two of these components.

Polyethyleneimines may be obtained by the polymerization of ethyleneimine and are commercially available on the market, for example in the form of the Lupasol® and Epomin® product families, and here, in particular, of the Lupasol® G20, Lupasol® FG, Lupasol® G35, Lupasol® P, and Lupasol®1595 products (the Lupasol® products are available from BASF (Florham Park, NJ, USA)), and Epomin® SP-003, Epomin® SP-006, Epomin® SP-012, Epomin® SP-018, Epomin® SP-200, Epomin® SP-1000, and Epomin® SP-1050 (the Epomin® products are available from Nippon Shokubai (Osaka, Japan)).

According to the invention, useful functionalized polyvinyl compounds are especially compounds based on the repeat unit $(CH_XCH_Y)$ n in which X is selected from the group consisting of H, $NH_2$, OH, COOH, COR, $CONH_2$, $CH_2NH_2$, $CH_2NHR$, $CH_2OH$ and $CH_2OR$ and Y is selected from the group consisting of $NH_2$, OH, COOH, COR, $CONH_2$, $CH_2NH_2$, $CH_2NHR$, $CH_2OH$ and $CH_2OR$, and where each R is independently alkyl, especially $C_1$-6-alkyl, or aryl, especially phenyl or pyridyl, which may be unsubstituted or optionally substituted by 1, 2, 3, 4 or 5 substituents independently selected from the group consisting of F, Cl, Br, CF3, C1-6-alkyl, $C_{1-6}$-alkoxy, $NH_2$, C1-6-alkyl, amino and di(C1-6-alkyl)amino.

A useful functionalized polyvinyl compound is preferably polyvinyl alcohol or polyvinylamine or a mixture thereof. The functionalized polyvinyl compound is more preferably a polyvinylamine.

The polyvinylamine and the polyvinyl alcohol may each preferably have a molecular weight (MW) von 500 to 1 000 000 daltons.

Suitable polyvinylamines especially include linear polymers and copolymers that derive from vinylformamide monomers and may comprise cationic and anionic polyvinylamine copolymers, and charged and protonated polyvinylamines.

Suitable polyvinylamines are commercially available on the market, for example those from the Lupamin® product family and here especially the products Lupamin® 1595, Lupamin® 4500, Lupamin® 5095, Lupamin® 9030, Lupamin® 9050 and Lupamin® 9095. Examples of cationic and anionic polyvinylamine copolymers are those from the Luredur® product family and here especially the products Luredur® Am na, Luredur® AV, Luredur® VH, Luredur® VI, Luredur® VM, Luredur® PR8094, Luredur® PR8261, and Luredur® PR8349. Examples of charged or protonated polyvinylamines are products from the Catiofast® product series and here especially the products Catiofast® GM, Catiofast® PL, Catiofast® PR8236, Catiofast® VCB, Catiofast® VFH, Catiofast® VLW, Catiofast® VMP and Catiofast® VSH. The Lupamin®, Luredur®, and Catiofast® products are available from BASF (Florham Park, NJ, USA).

The formaldehyde-free granulating additive preferably comprises at least:
- a combination of at least one polymer or oligomer containing amino groups and at least one functionalized polyvinyl compound, preferably a combination of polyethyleneimine and polyvinyl alcohol; and/or
- a compound selected from the group of the aliphatic dicarboxylic acids and anhydrides, the aliphatic tricarboxylic acids and anhydrides, the aromatic dicarboxylic acids and anhydrides, preferably a compound selected from the group consisting of oxalic acid, succinic acid, citric acid, phthalic acid, phthalic anhydride; and/or
- an aliphatic $C_2$-$C_8$ dialdehyde, preferably ethanedial and/or glutaraldehyde.

The amphiphilic derivative preferably contains a compound selected from the group of the aliphatic dicarboxylic anhydrides and anhydrides, the aliphatic tricarboxylic acids and anhydrides, the aromatic dicarboxylic acids and anhydrides, preferably a compound selected from the group consisting of oxalic acid, succinic acid, citric acid, phthalic acid, phthalic anhydride; and/or at least one aliphatic C2-C8 dialdehyde, preferably ethanedial and/or glutaraldehyde.

In a preferred embodiment, the melt does not contain any added amphiphilic additive as described above, in relation to urea and elemental sulfur. The absence of a mixing additive lowers the costs of the finished fertilizer granules, and avoids adverse effects on the efficacy of the fertilizer granules in uptake by the plants.

The invention further encompasses the use of the above-described fluidized bed granulator of the invention for production of fertilizer granules comprising urea-sulfur, urea, ammonium sulfate, UAS (urea ammonium sulfate), UAN (urea ammonium nitrate) and/or mixtures thereof.

FIG. 1 shows a schematic cross section through the inventive spray nozzle (4) comprising a conveying channel (5) and an atomizing gas channel (6). The spray nozzle (4) is characterized in that the conveying channel (5) has at least one separating pin (7), for example in the form of a tube mounted in the atomizing channel (6). The atomizing channel (6) has at least one swirl element (8). The melt (1) is divided in the region of the separating pin (7) and swirled, preferably in a turbulent manner. This swirling surprisingly increases the homogeneity of the melt (1). The atomizing gas (9) is guided through the spray nozzle (1) via the atomizing channel (6). The swirl elements (8) mounted in the atomizing channel (6) increase the turbulence of the atomizing gas (9) passed through, for example air. If oxygen-sensitive granules are to be produced, rather than air, it is also possible to use gases/gas mixtures composed of noble gases, especially argon, nitrogen or carbon dioxide. The mixing of melt (1) and atomizing gas is effected outside the exit area (3) of the spray nozzle (4). This mixing of the melt outside the spray nozzle (4) ensures particularly uniform particle growth.

Figure 2:
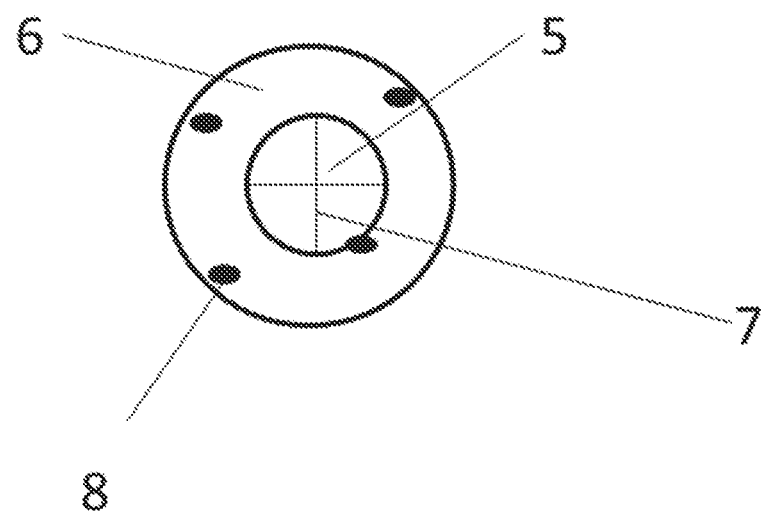
FIG. 2 is a schematic top view of the spray nozzle.

FIG. 2 shows a schematic top view of the inventive spray nozzle (4), restricted to the atomizing channel (6) and conveying channel (5). The separating pins (7) are in a crossed arrangement.

Figure 3:
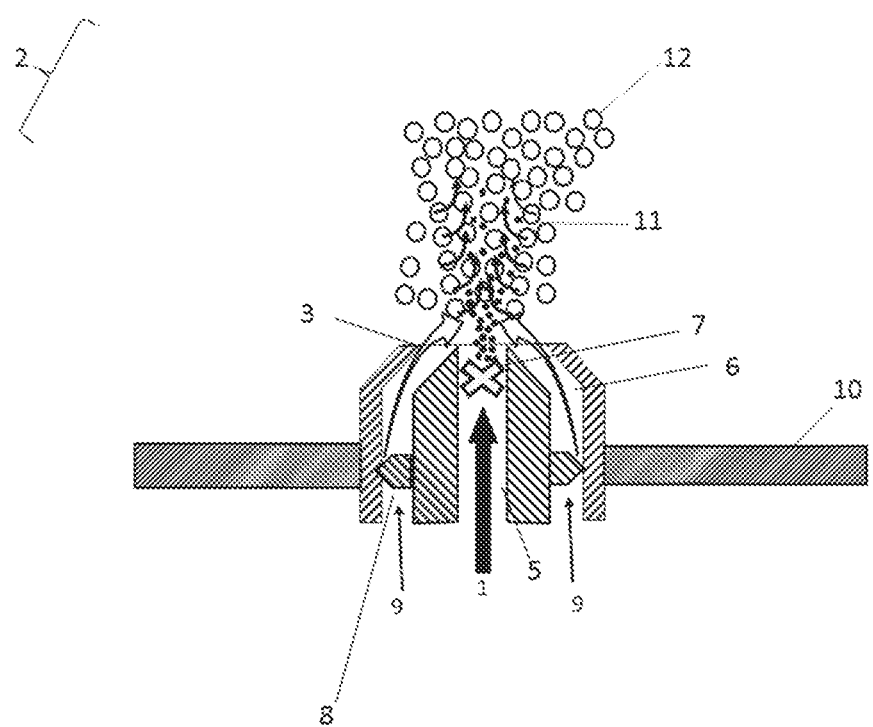
FIG. 3 is a further schematic cross section of the spray nozzle disposed within the perforated plate.

FIG. 3 shows a further schematic cross section of the inventive spray nozzle (4) arranged in the perforated plate (10). The spray nozzle comprises a conveying channel (5) and an atomizing gas channel (6). The conveying channel (5) comprises two crossing separating pins (7); the atomizing channel (6) comprises swirl elements (8). The melt (1) and the atomizing gas (9) mix outside the planar exit opening (3), where they meet the granule particles (12) present in the fluidized bed (not shown) in the form of microdroplets (11). The granule particles (12) grow to their ultimate size (not shown) by virtue of the addition of the microdroplets (12) and are subsequently removed from the fluidized bed granulator interior (2) (not shown).

LIST OF REFERENCE NUMERALS (1) melt
(2) fluidized bed granulator interior
(3) exit area
(4) spray nozzle
(5) conveying channel
(6) atomizing channel
(7) separating pin
(8) swirl element
(9) atomizing gas
(10) perforated plate
(11) melt droplets
(12) granule particles

What is claimed is:
1. A spray nozzle for production of urea fertilizer granules and/or urea-sulfur fertilizer granules, the nozzle comprising:
a conveying channel capable of conveying a melt, and
an atomizing gas channel capable of conveying a gas, the conveying channel comprising a first separating pin and a second separating pin, the first and second separating pins comprising cylindrical elements disposed in a crossed arrangement, the first and second separating pins enabling separation and subsequent mixing of the melt, the atomizing channel comprising a swirl element, wherein the swirl element comprises inserts, cutouts, and moving and fixed elements, and wherein the conveying channel and the atomizing gas channel are planar to one another and form a common exit opening.

2. The spray nozzle of claim 1 wherein the cylindrical elements further comprise one of rods and wires.

3. A fluidized bed granulator comprising at least one spray nozzle according to claim 1 disposed atop a perforated plate.

4. A process for producing a urea-sulfur fertilizer, comprising:

providing a melt containing urea and elemental sulfur;

spraying the melt and atomizing gas into a fluidized bed granulator with a spray nozzle; and obtaining granules in the fluidized bed granulator;

wherein the spray nozzle comprises a conveying channel and an atomizing gas channel, wherein the conveying channel comprises first and second separating pins arranged in a crossed arrangement and the atomizing channel comprises a swirl element, and wherein the melt is introduced via the conveying channel at a pressure of about 0.5 bar to 7 bar.

5. The process of claim 4 wherein the melt contains a granulating auxiliary.

6. The process of claim 5 wherein the granulating auxiliary is formaldehyde or a formaldehyde-free granulating additive.

7. The process of claim 6 wherein the formaldehyde-free granulating additive comprises a combination of at least one polymer or oligomer containing amino groups and at least one functionalized polyvinyl compound.

8. The process of claim 7 wherein the formaldehyde-free granulating additive comprises a combination of polyethyleneimine and polyvinyl alcohol.

9. The process of claim 6 wherein the formaldehyde-free granulating additive comprises:

a combination of at least one polymer or oligomer containing amino groups and at least one functionalized polyvinyl compound; and/or a compound selected from the group of the aliphatic dicarboxylic acids and anhydrides, the aliphatic tricarboxylic acids and anhydrides, the aromatic dicarboxylic acids and anhydrides; and/or an aliphatic $C_2$-$C_8$ dialdehyde.

10. The process of claim 4 wherein the melt contains an additive which is amphiphilic with respect to urea and elemental sulfur.

11. The process of claim 10 wherein the amphiphilic additive comprises anionic, cationic or nonionic surfactants.

12. The process of claim 11 wherein the amphiphilic additive comprises salts and esters of fatty acids, SDS, AOT, lignin and/or lignosulfonates and/or mixtures and/or derivatives thereof.

13. The process of claim 4 wherein the spray nozzle is maintained at a temperature in the range from 1° C. to 10° C. above the crystallization temperature of the melt.

14. The process of claim 4 wherein the melt is introduced via the conveying channel at a flow rate of about 50 kg/h to 600 kg/h.

15. The process of claim 4 wherein atomizing gas is introduced via the atomizing channel at a flow rate of about 50 kg/h to 400 kg/h and/or is introduced at a pressure of about 0.1 bar to 2 bar.

16. The process of claim 4 wherein the melt is obtained by continuously mixing a urea-containing melt and an elemental sulfur-containing melt.

17. The process of claim 4 wherein the granules contain about 2% by weight to 30% by weight of sulfur.

18. The process of claim 4 wherein the melt is free of any additive that is amphiphilic with respect to urea and elemental sulfur.

* * * * *